United States Patent Office 3,432,636
Patented Mar. 11, 1969

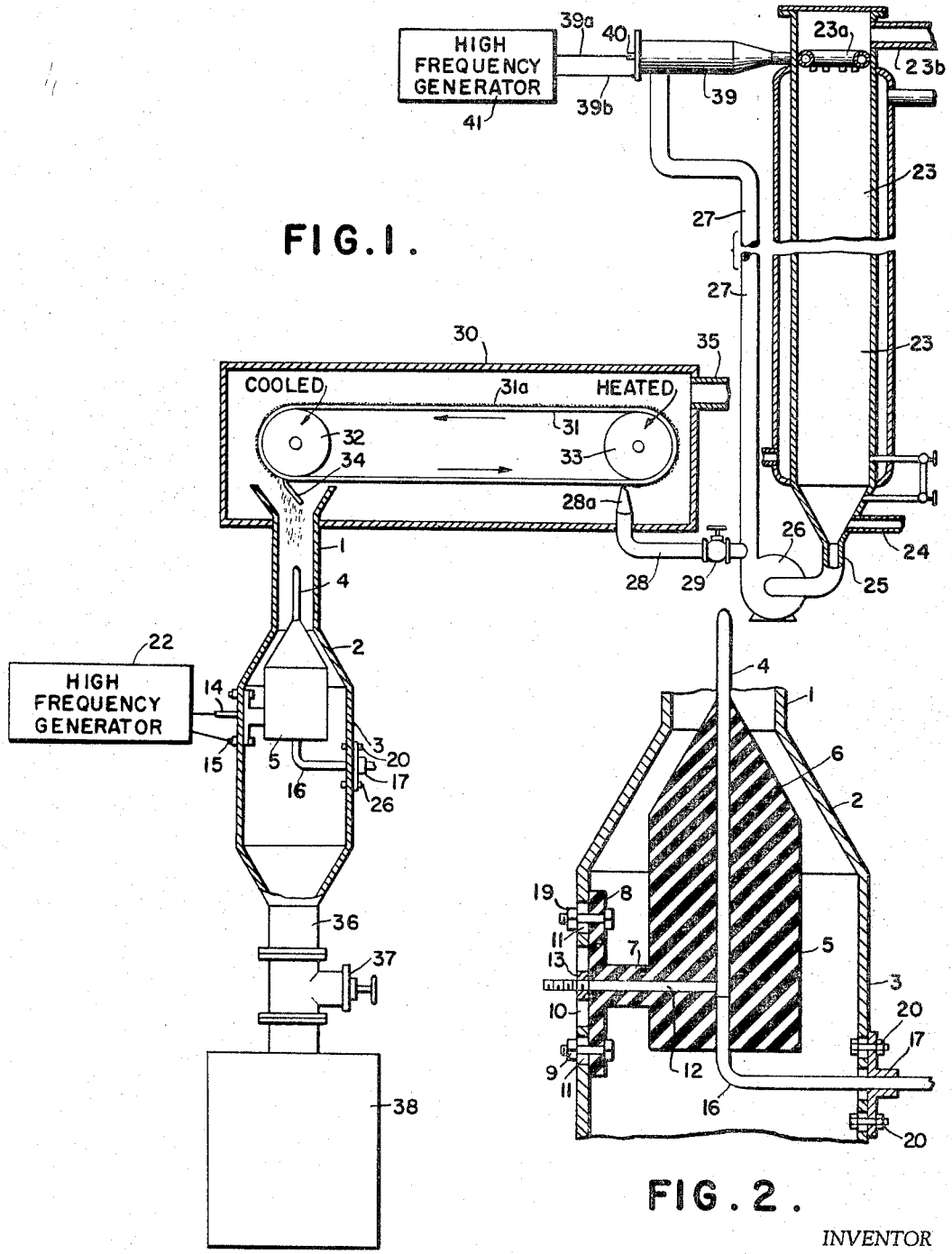

3,432,636
METHOD OF AND APPARATUS FOR PRODUCING DRY CONCENTRATES FROM LIQUID MATERIALS
Ralph G. Sargeant, Lakeland, Fla., assignor to Pet Incorporated, St. Louis, Mo., a corporation of Delaware
Filed Mar. 9, 1965, Ser. No. 438,243
U.S. Cl. 219—10.65
Int. Cl. H05b 3/60
4 Claims

ABSTRACT OF THE DISCLOSURE

The apparatus makes use of high frequency electric current, commonly called "radio frequency," and a special electrode structure by which the energy is applied to drying the granular or powdered material. The apparatus includes a vertically disposed cylindrical shell into the open top of which the partially dried material is fed. A tubular electrode extends concentrically up into this cylindrical shell, and provision is made for regulating the flow of the product in such manner that the portion of the electrode within the shell is maintained completely embedded in the mass of material being dried and moving downward through the shell.

Under these conditions, the tubular electrode tends to become too hot and provision is made for cooling it. This comprises a smaller tube of rubber or plastic, and extending up inside the electrode to the top, which is closed. A cooling fluid, such as water, is fed into the inner tube and issues at the upper end in the form of a jet, which impinges against the closed top of the electrode and then runs down the inside walls thereof.

This invention relates to the production of dry crystallized or powdered edible concentrates. While applicable to other products, it is particularly useful in producing dry orange and grapefruit juice concentrates, tea and coffee concentrates, and dried eggs.

I will first discuss the invention as applied to orange juice.

For more than half a century many attempts have been made to produce a satisfactory dry orange juice concentrate which can be simply dissolved in water to provide an acceptable orange juice drink.

But these attempts have not been entirely successful. Not only have they involved the problem of damaging the taste and flavor of the juice by the application of the heat necessary for drying, but for some reason, not fully understood, it has heretofore been found impossible to reduce the moisture content of the finished product below 2% to 3%. It has further been found that the presence of this amount of residual moisture causes serious deterioration of the product when packed in cans. For this reason, it has become the general commercial practice to place in each can a package of a suitable desiccant, such as silica gel (see Patent No. 2,520,878 to Cotton). It is recognized by the industry that the use of such a desiccant in the cans is highly undesirable, but although large quantities of the dried product are packed and sold, especially for the use of the armed forces, to the best of my knowledge no one up to this time has been able to successfully avoid the necessity of utilizing a desiccant, and it is now the universal practice to employ a desiccant.

One object of the invention is to devise a method and apparatus by which the residual moisture content of the dried product can be reduced to such an extent that the placing of a package of desiccant in the can or other container is not necessary to prevent deterioration. I accomplish this by subjecting the partially dried product to the action of high frequency electrical energy, by means of a special electrode structure, to remove the major portion of the objectionable residual moisture.

Another object is to reduce the moisture content to the desired degree without in any way damaging the taste or flavor of the product. This I achieve by maintaining the temperature below a certain critical point while removing the moisture.

The usual commercial practice is to begin the drying process with concentrate of a density of no more than 55° Brix. This contains so much water that a relatively high temperature, such as 200° F., and long retention time are required for drying, often resulting in giving a caramelized taste to the dried product.

A still further object of the invention is to overcome these objections by bringing the concentrate up to a density of 70° to 80° Brix, using the method described in my prior Patent No. 3,072,490, Jan. 3, 1963, before starting the actual drying operation, and thereafter maintaining the temperature at a relatively low degree. Since there is so much less water to be removed, the retention time is greatly reduced, and the process is much more economical. Also, caramelization and off flavors are avoided.

In order that the invention may be readily understood, reference is had to the accompanying drawings, forming part of this specification, and in which:

FIG. 1 is a diagrammatic view, partly in side elevation and partly in section, illustrating my improved apparatus in its entirety;

FIG. 2 is a fragmentary vertical section through part of the electrode structure on a somewhat larger scale.

Figure 3:
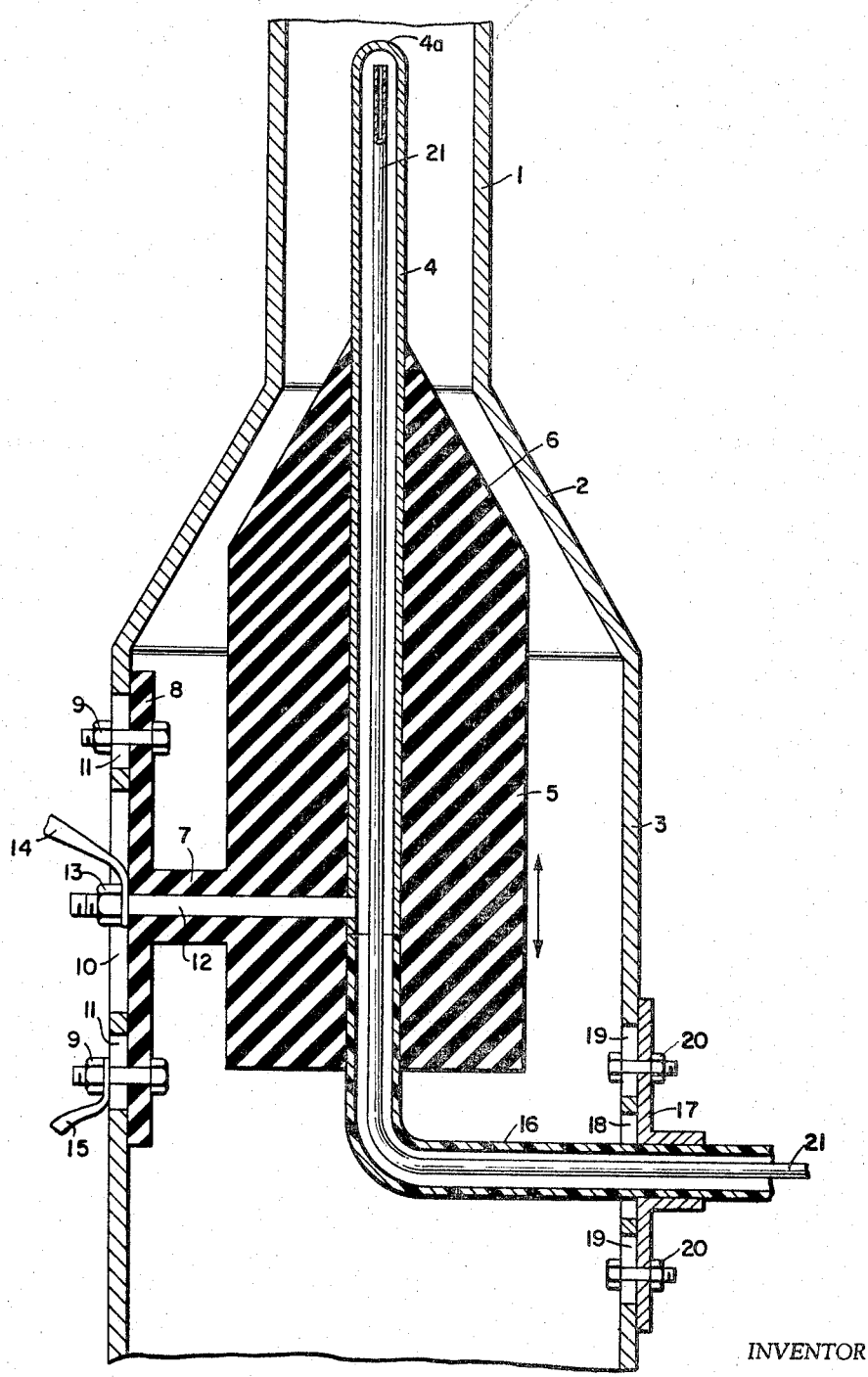
FIG. 3 is a similar view on a still larger scale.

In carrying out the invention, I employ a special electrode structure similar in general to that shown in FIG. 3 of my said prior Patent No. 3,072,490, but differing therefrom in important respects.

Referring to the drawings in detail, and first more particularly to FIGS. 2 and 3, my improved electrode structure includes a cylindrical outer shell 1, which, when in use, is disposed in a vertical position, as shown. The lower end of the cylindrical shell merges into a downwardly flaring conical skirt 2, which, in turn, is connected with a lower cylindrical casing 3.

Supported at its lower end on a block of insulating material 5, housed within the casing 3, is an inner electrode 4, in the nature of a metallic tube, projecting upwardly into the shell 1, and disposed co-axially thereof. The upper end of the block 5 is conical, as shown at 6, the sides of the cone being parallel with the flaring skirt 2. Thus, an annular passage is formed between the inner electrode 4 and the shell 1, between the skirt 2 and conical portion 6 of the block 5, which portion of the passage I shall call a "throat," and between the block 5 and the walls of the casing 3. The powdered material to be dried is fed into the open upper end of the shell 1, and flows by gravity down through the above described annular passage.

The insulating block 5 is supported, as by means of a neck 7 and integrally formed plate 8, on the wall of the casing 3, and the plate 8 is secured to such wall by means of bolts 9 extending through the plate, and through vertical slots 11, formed in the wall 3. By loosening the nuts on the bolts 9, the plate 8 and the block 5 may be adjusted up or down, thus varying the width of the throat between the co-axial conical parts 2 and 6, and thus controlling the rate of flow of the powdered material. This rate of flow should be so regulated relative to the rate at which the powdered material is fed into the top of the shell 1 that the material accumulates in the shell to form a solid mass, and the height of this mass or column is maintained above the upper end of the inner electrode.

A conductor 12 extends through the block 5 and neck 7 of the insulator, as well as through a relatively large opening 10 in the wall of the casing 3, and carries at its outer end a nut 13, under which a lead 14 is clamped. The opening 10 is made relatively large so as to permit the vertical adjustment of the block 5 and plate 8, as described, while insuring proper clearance between the conductor 12 and wall of the casing at all times.

As shown in FIG. 1, a high-frequency generator 22 is provided, and has one pole grounded on the casing 3, as at 15, and the other pole insulated from the casing and connected with the conductor 12, as indicated at 14.

By "high-frequency" I mean what is commonly called radio frequency, that is, a frequency of from 1 to 25 megacycles or more, as in my above mentioned patent.

Thus as the mass of powdered material passes down through the annular space between the shell 1 and inner electrode 4, it is subjected to the action of the high-frequency electrical energy, which is applied radially of the moving column. This high-frequency electrical energy seems to search out the molecules of water which lie hidden in and stubbornly cling to the powder, and vaporizes them, at the same time generating a certain amount of heat. It is not known whether the result is due entirely to the heating effect of the electrical energy, which, of course, is applied with absolute uniformity throughout the mass, or whether this energy operates in some special way on the particles of water, but, by the method described, it has been possible to remove from the powdered mass moisture which has defied all other methods. By the use of my improved apparatus, I have fed into the upper end of the shell conventional powdered citrus juice containing 2% to 3% moisture, and reduced the residual moisture content to less than 1%, and it has been found that a product containing only this small amount of moisture will keep indefinitely, when packed, without the necessity of putting any desiccant in the container.

It has been found, however, that the material being dried becomes too hot, where it is in contact with the inner electrode and tends to sinter and get sticky, unless the temperature is controlled. This is because there is no circulation, as is the case in treating a liquid as in my said prior patent, and no way in which the heat can escape. I have therefore devised means for cooling the inner electrode to maintain it at a temperature below the melting point of the powder, so that the particles will not adhere to each other, and the mass will remain fluent. The cooling means, as best shown in FIG. 3, consists of a relatively small plastic tube 21 which is inserted into the tubular electrode 4 from the lower end thereof, and extends substantially to the upper end 4a, which is closed. A cooling fluid such as water is fed into this tube under pressure. The water issues from the upper end of the tube in the form of a jet, which impinges against the closed end of the electrode 4 and runs down the inner walls thereof. To carry off this water, I embed in the lower part of the block 5, in alinement with the electrode, a plastic or rubber pipe or hose 16, through which the tube 21 extends. To enable the pipe or hose 16 to be adjusted up and down with the block 5, I support it in a plate 17 which is secured by bolts 20 to the casing 3, such bolts extending through vertical slots 19 in the casing, similar to the slots 11, and the pipe or hose 16 itself extending through a vertical slot 18.

Instead of water, a jet of air may, in some cases, be used for cooling.

So far, I have discussed treating powdered citrus juice prepared by conventional processes for the purpose of reducing the residual moisture content. In such conventional processes, it is customary to concentrate the juice to a density of not more than 55° Brix before beginning the actual drying step. As above pointed out, this method has serious disadvantages, and I find that it is much more preferable to raise the density of the concentrate to a density of 70° to 80° Brix before starting the drying operation.

This may be accomplished by the arrangement shown in FIG. 1, in which I have illustrated part of the apparatus shown in my said prior patent. The apparatus comprises an evaporating chamber 23, maintained under vacuum, as in my said patent, by a conduit 23b, connected with a vacuum pump. Juice to be concentrated is introduced into this chamber through pipe 24, and is recycled through the chamber through pipes 25 and 27, and rotary pump 26. Included in said pipe 27 is a special electrode structure 39, by which high-frequency electrical energy from a generator 41 is applied to the juice, as in said prior patent. The juice from pipe 27 enters one end of the electrode structure and is delivered from the other end into a spray head 23a, at the top of the evaporating chamber 23. The electrode structure comprises an insulated, central electrode 40, to which one lead 39a from the generator 41 is connected, while the other lead 39b is grounded on the outer electrode. By following the procedure described in said patent, I am enabled to produce a concentrate of a density of from 70° to 80° Brix, and very low viscosity, having no caramelized or other off flavor. This high density, low viscosity concentrate is then fed from the pipe 27 through pipe 28 controlled by valve 29, into any suitable drying apparatus 30. This may comprise a belt 31, travelling over rollers 32 and 33, onto the under side of the lower run of which belt the concentrate is delivered from pipe 28 through an application 28a.

The matter of viscosity is of the utmost importance. When using conventional steam evaporators, operating by the thermal conduction method, and producing a concentrate of only 55° Brix, as above mentioned, the viscosity may run to 4,000 to 5,000 centipoises. It not sufficient to cause the liquid concentrate to effectively stick to the under side of the belt, a special additive may be incorporated in the liquid. By using the method taught in said patent, and also by my prior Patent No. 3,366,497 issued Jan. 30, 1968, I have been able to run the density of the concentrate up to 72° Brix or more, while maintaining the viscosity as low as 3,000 centipoises, with marked advantages.

But, in the special case where as in FIG. 1, I feed this high density concentrate on to a belt and roller type drier, I find that a viscosity of 3,000 centipoises is a little too low to cause the concentrate to properly adhere to the under side of the belt. I therefore prefer to so control the process as to obtain a viscosity of between 3,500 and 5,000 centipoises, which is still relatively low, but sufficient, at a density of 72° Brix, to cause the concentrate to effectively stick to the belt, without the necessity of using any additive.

The viscosity can be controlled in several different ways. One factor is the amount of pressure employed in both the extractor and the juice "finisher." Another factor is the exact temperature of the evaporator. Still another is the amount of power applied to the electrode structure, and the rate of flow of the material through the structure, as determined by the speed of the pump. The slower this rate of flow, i.e., the longer the liquid is exposed to the action of the high frequency energy, the higher the viscosity. The applicator 28a spreads the concentrate on the belt in a thin film, as indicated at 31a. The roller or drum 33 is heated, as by means of steam or hot water, to evaporate the water from the film, while the roller or drum 32 is cooled, as by means of cold water, to promote crystallization of the material. The interior of the drier casing is connected by conduit 35 to a vacuum pump to draw off the vapors.

The drying roller on drum 33 is maintained at such temperature as to evaporate the water without injuring the taste or flavor of the concentrate. By virtue of the fact that I start with a liquid concentrate of 70° to 80° Brix, I am enabled to lower the temperature of the drier drum from about 200° F., usually employed when drying liquid concentrates of only 55° Brix, to 90° to 110° F. The partially dried product is scraped from the belt by means of a doctor blade 34, and falls into the open upper end of the shell 1 of the electrode structure. The material coming off the belt may have a moisture content of at least 2% to 3%, but, as above described, after passing through the electrode structure and being subjected to the high-frequency electrical energy, the residual moisture is reduced to 1% or less.

The product passes down from the casing 3 through a pipe 36, controlled by a valve 37, into a receptacle 28. When this receptacle becomes filled, the valve 37 is closed, the full receptacle removed, and a new one substituted.

During the operation of the apparatus, it is essential that the shell 1 be kept full of the powdered or crystalline material up to a level above the upper end of the electrode 4. Thus the entire upper portion of the electrode is completely embedded in the mass of granular material being dried. This is to avoid ionization.

Since the rate at which the material is fed into the upper end of the shell 1 may vary, it is necessary to provide means, such, for example, as that above described, for adjusting the electrode 4 and insulating block 5 up and down to vary the size of the annular throat between the conical end of the block and the tapering skirt 2, thus controlling the rate at which the material flows through the throat. The size of the throat is adjusted until the rate of discharge substantially equals the rate at which the material is fed in, thus maintaining the shell 1 solid full. Any other suitable means for adjusting may, of course, be employed.

In making dry powdered grapefruit juice concentrate, I proceed in a similar manner.

Coming now to the question of a dry powdered or crystalline tea concentrate, ordinary liquid tea, as commonly brewed, has a solids content of 4% to 5%. I have treated this liquid tea in my improved evaporator such as shown in FIG. 1 by means of high-frequency electrical energy (as described in my said above identified patent), at a relatively low temperature, until it was brought to a density of over 72° Brix, with very low viscosity. I then dried this liquid concentrate by means of the apparatus herein shown and described, and obtained a dry crystalline or powdered product sufficiently free from residual moisture to keep indefinitely when packed, and when dissolved in water, yielding a drink of excellent flavor.

While the temperature employed in evaporating the tea extract to the high density mentioned is not as critical as in the case of citrus juice, the low temperature of around 80° F., specified in my said patent, is preferable.

And while, since tea does not contain sugar, like citrus juices, the removal of residual moisture is not so important, it is found that such removal is advantageous, in that it results in better flavor retention during shelf-storage.

And I have successfully done the same with liquid coffee.

The liquid coffee, as commonly extracted from the roasted, ground beans, usually contains about 25% of solids, i.e., it has a density of around 25° Brix. As in the case of tea, I then put this extract through my high-frequency electrical evaporator, raising its density to 72° Brix or more. Again the temperature used is not so critical as with citrus juice, but a temperature of not substantially more than 80° F., as specified in my said patent, is preferable, because at higher temperatures, the volatile flavoring elements and aroma are likely to be driven off.

Coffee powder, like tea, can be packaged, and will keep, with a moisture content of 2% to 2½%, without a desiccant, but by reducing the residual moisture to 1% or less, by my improved high-frequency method herein described in connection with citrus juice, it has better flavor retention.

The essential thing in producing all of these dry powdered concentrates is to first bring the starting liquid to a condition of relatively high density such as 70° to 80° Brix, and low viscosity, and then dry the liquid at a relatively low temperature, such as 90° to 110° F.

The chief advantages of my improved method and of the dry powdered tea and coffee concentrates made thereby, as herein described, are (1) the concentrates are of better quality and flavor; (2) they have better shelf life, dissolve more readily, and are more stable; (3) larger capacity and less energy needed for a given size drier, because of starting with a high density liquid and using lower temperature, thus giving better economy.

The material coming out of a conventional drier, such as indicated at 30, is often more or less crystalline in form, and is subsequently ground to a powder. Therefore, where in the claims, I use the word "powder," I mean to include either crystals or a ground powder.

Another product which I have been able to effectively produce by means of my improved method and apparatus is dried eggs.

As in the case of the other products herein described, there are two phases to the treatment of eggs, namely, (1) concentrating, and (2) drying.

As to the first phase, I have discovered that raw, whole eggs can be successfully concentrated by passing them through the improved high-frequency electrical evaporator shown in FIG. 1, and described more in detail in my said patent.

Whole eggs contain about 25% solids. I take the whole eggs, mix up the yolks and whites, and pass the mixture through my improved apparatus, controlling the temperature as in the case of citrus juice. I am able to continue the process until sufficient water has been removed to give a concentrated liquid product containing about 50% solids, and having normal taste and flavor. This product may be packed and stored under refrigeration, and used for cooking. For instance, it makes acceptable "scrambled eggs." So far as I am aware, I am the first to produce acceptable concentrated whole eggs in liquid form.

Or, after concentrating, I may proceed to the second phase, namely, drying this concentrated product. This may be done by means of the apparatus shown in FIG. 1, i.e., the belt and roller method. The fact that the concentrated material contains twice as much solids as natural, fresh eggs, makes it possible to employ relatively low drying temperatures, such as 90° F. to 110° F., as above described in connection with other products, with the result that the dried product has better flavor, and can be reconstituted more readily.

Conventional dried eggs have a moisture content of 3% to 5%. By feeding the dried eggs down through my new electrode structure 1, 2, 3, 4, I am able to produce a product having a residual moisture content of not more than 1%. This product has better keeping qualities, better flavor, and reconstitutes better.

Instead of running the concentrated liquid eggs through a belt and roller type drier, as described, they may be fed into a conventional spray drier. The residual moisture may be removed from this spray dried material by means of my novel electrode structure 1, 2, 3, 4, as above described.

I have also treated egg whites the same way. Fresh egg whites have a solids content of 12% to 13%, and I can concentrate them at low temperature to around 26% or more of solids, and then dry them. The concentrated liquid whites have an extraordinarily low viscosity of around 300 to 400 centipoises, and for this reason, spray drying is preferred. The spray dried material can be passed through my special electrode structure, 1, 2, 3, 4, and the residual moisture reduced to around 1%, as in the case of whole eggs.

While I have shown and described my improved, fluid-cooled electrode structure for use in connection with the treatment of dry, granular or powdered materials, I also contemplate the use of this cooled electrode in connection with heat-sensitive liquid materials.

Furthermore, I wish it to be understood that I contemplate the use of such a fluid-cooled electrode whether disposed vertically, as in the present application, or horizontally, as in my said patent.

What I claim is:

1. Apparatus for drying powdered edible products including an electrode structure comprising a cylindrical outer shell, disposed vertically, and having an open upper end, means for feeding the powdered product into said open upper end, an inner elongated electrode supported at its lower end only and extending coaxially up into said cylindrical shell, thus providing an annular passageway between said shell and electrode, a high-frequency generator having one pole grounded on said shell and the other pole insulated from said shell and connected with said inner electrode, and means for so regulating the downward flow of the product through said cylindrical shell that the entire upper portion of said inner electrode lying within said shell is maintained completely embedded in the mass of powdered material.

2. Apparatus in accordance with claim 1 in which the inner electrode is supported on a cylindrical block of insulating material having a conical upper end, and in which said shell has a conical skirt concentrically surrounding said conical end, thus forming an annular throat through which the powdered material may flow.

3. Apparatus in accordance with claim 1 in which the inner electrode is in the form of a tube having its upper end closed, and in which means are provided for circulating a cooling fluid through the interior of said tubular electrode, to control its temperature.

4. Apparatus for subjecting fluent materials to the action of high-frequency electrical energy, comprising a conducting outer shell, an inner tubular electrode extending coaxially within said shell, thus forming an annular passageway, means for circulating a fluid other than said fluent material through the interior of said tubular electrode to cool the same, means for feeding the fluent material through said passageway, and a high-frequency generator having one pole grounded on said shell, and the other pole insulated from said shell and connected with said tubular electrode.

References Cited

UNITED STATES PATENTS 2,483,623  10/1949  Clayton _____ 219—10.65
3,060,297  10/1962  Sargeant _____ 219—10.65

FOREIGN PATENTS 839,688  4/1952  Germany.

RICHARD M. WOOD, *Primary Examiner.*

L. H. BENDER, *Assistant Examiner.*

U.S. Cl. X.R.

99—205